(12) United States Patent
Boissiere

(10) Patent No.: US 10,508,633 B2
(45) Date of Patent: Dec. 17, 2019

(54) DEVICE AND METHOD FOR CONTROLLING A MODULE FOR HEATING A PLURALITY OF INJECTORS

(71) Applicants: CONTINENTAL AUTOMOTIVE FRANCE, Toulouse (FR); CONTINENTAL AUTOMOTIVE GmbH, Hannover (DE)

(72) Inventor: Philippe Boissiere, Pinsaguel (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 572 days.

(21) Appl. No.: 14/659,678

(22) Filed: Mar. 17, 2015

(65) Prior Publication Data

US 2015/0267672 A1 Sep. 24, 2015

(30) Foreign Application Priority Data

Mar. 19, 2014 (FR) ...................... 14 52283

(51) Int. Cl.
*F02M 53/02* (2006.01)
*F02M 53/06* (2006.01)
(Continued)

(52) U.S. Cl.
CPC ......... *F02M 53/02* (2013.01); *F02D 41/3005* (2013.01); *F02M 31/125* (2013.01);
(Continued)

(58) Field of Classification Search
CPC .... F02D 2041/2027; F02D 2041/3005; F02M 2700/077; F02M 31/125; F02M 53/02; F02M 53/06; Y02T 10/126
(Continued)

(56) References Cited

U.S. PATENT DOCUMENTS 3,324,374 A * 6/1967 Corey .................. H02M 5/45
307/107
3,444,450 A * 5/1969 Koppelmann ........ H02J 3/1842
307/104
(Continued)

FOREIGN PATENT DOCUMENTS

CN 101144448 3/2008
CN 101421506 4/2009

OTHER PUBLICATIONS

FR Search Report, dated Sep. 10, 2014, from corresponding FR application.

*Primary Examiner* — Dana Ross
*Assistant Examiner* — Joe E Mills, Jr.
(74) *Attorney, Agent, or Firm* — Young & Thompson

(57) ABSTRACT

A method, and associated device, for controlling a module for heating a plurality of fuel injectors of an engine of a vehicle, the heating module including a plurality of electromagnetic induction elements each connected to an injector of the plurality of fuel injectors and being configured, when an electric excitation current passes through the electromagnetic induction elements, to heat the injector by induction, the method including a step of generating an electric supply current and a step of generating, from the electric supply current, a plurality of electric excitation currents phase shifted relative to one another and materialized by electric excitation current signals, each of the electric excitation currents intended to supply one of the electromagnetic induction elements. The method being notable in that the electric excitation current signals are phase shifted such that the sum of the absolute values of the amplitudes of the signals is constant.

4 Claims, 5 Drawing Sheets

(51) Int. Cl.
    *F02M 31/125*     (2006.01)
    *F02D 41/30*     (2006.01)
    *F02D 41/20*     (2006.01)

(52) U.S. Cl.
    CPC ..... *F02M 53/06* (2013.01); *F02D 2041/2027* (2013.01); *F02D 2041/2072* (2013.01); *F02M 2700/077* (2013.01); *Y02T 10/126* (2013.01)

(58) Field of Classification Search
    USPC ......... 123/445, 549; 219/662, 635, 641, 651
    See application file for complete search history.

(56) References Cited

U.S. PATENT DOCUMENTS

| | | | | |
|---|---|---|---|---|
| 3,780,324 | A * | 12/1973 | Greenwell | H02K 3/28 310/180 |
| 4,468,603 | A * | 8/1984 | Vander Meer | H02P 23/26 318/729 |
| 5,201,341 | A * | 4/1993 | Saito | F02D 7/02 123/557 |
| 5,475,582 | A | 12/1995 | Fabianowski et al. | |
| 5,844,786 | A | 12/1998 | Yoshida et al. | |
| 6,332,453 | B1 * | 12/2001 | Yamakado | F02D 41/20 123/490 |
| 6,528,770 | B1 * | 3/2003 | Akel | H05B 6/065 219/624 |
| 7,778,045 | B2 * | 8/2010 | Alexander | H02M 3/1582 363/124 |
| 9,178,430 | B2 * | 11/2015 | Tamura | H02M 3/33569 |
| 2003/0218438 | A1 * | 11/2003 | Atmur | H02P 6/10 318/400.2 |
| 2007/0200006 | A1 * | 8/2007 | Czimmek | F02M 53/06 239/5 |
| 2007/0235086 | A1 * | 10/2007 | Hornby | F02M 51/0671 137/334 |
| 2007/0235569 | A1 * | 10/2007 | Hornby | F02M 51/0671 239/585.1 |
| 2008/0013351 | A1 * | 1/2008 | Alexander | H02M 3/1582 363/123 |
| 2008/0053415 | A1 | 3/2008 | Marriot | |
| 2009/0078965 | A1 * | 3/2009 | Briere | H01L 27/0605 257/192 |
| 2009/0145491 | A1 | 6/2009 | Hlousek et al. | |
| 2010/0066341 | A1 * | 3/2010 | Watanabe | H02M 3/158 323/311 |
| 2011/0057640 | A1 * | 3/2011 | Cuk | H02M 3/005 323/311 |
| 2011/0180040 | A1 * | 7/2011 | Czimmek | F02D 41/20 123/478 |
| 2011/0180624 | A1 * | 7/2011 | Czimmek | F02M 57/005 239/135 |
| 2011/0301811 | A1 * | 12/2011 | Boissiere | H02J 7/0065 701/36 |
| 2012/0051100 | A1 | 3/2012 | Alexander | |
| 2012/0267359 | A1 * | 10/2012 | Czimmek | H05B 6/04 219/660 |
| 2012/0268219 | A1 * | 10/2012 | Czimmek | H03B 5/1228 331/117 FE |
| 2012/0268220 | A1 * | 10/2012 | Czimmek | H05B 6/04 331/117 FE |
| 2012/0268221 | A1 * | 10/2012 | Czimmek | F02M 53/06 331/117 R |
| 2012/0268222 | A1 * | 10/2012 | Czimmek | H03K 17/08142 331/186 |
| 2012/0285424 | A1 * | 11/2012 | Mowery | F02M 53/06 123/549 |
| 2014/0121846 | A1 * | 5/2014 | Dase | F02D 41/20 700/283 |
| 2014/0121939 | A1 * | 5/2014 | Viele | F02D 41/20 701/102 |
| 2014/0182563 | A1 * | 7/2014 | Czimmek | F02M 53/02 123/557 |
| 2014/0183185 | A1 * | 7/2014 | Czimmek | H05B 6/08 219/666 |
| 2014/0252122 | A1 * | 9/2014 | Hertwig | F02M 51/061 239/132 |

* cited by examiner

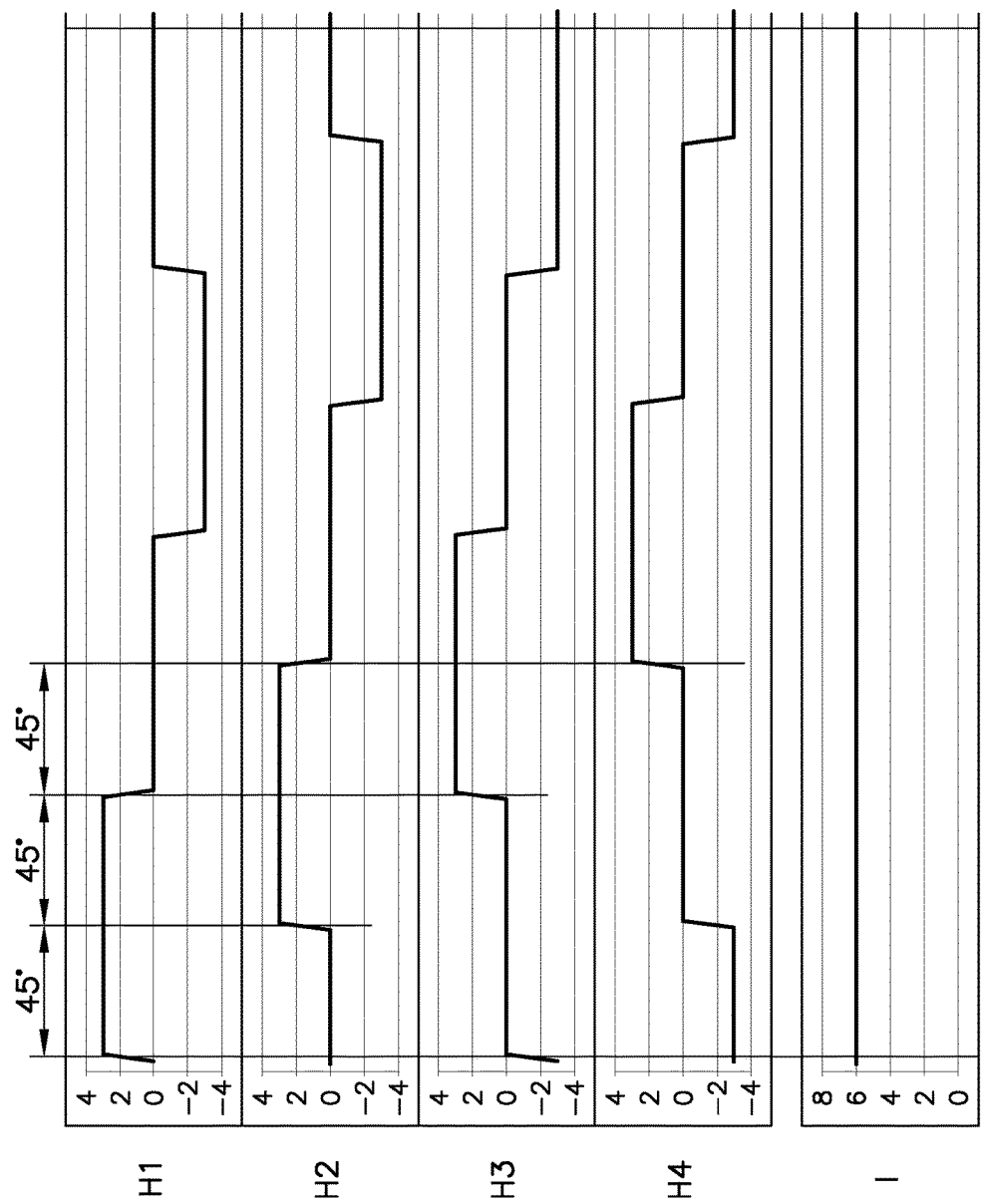

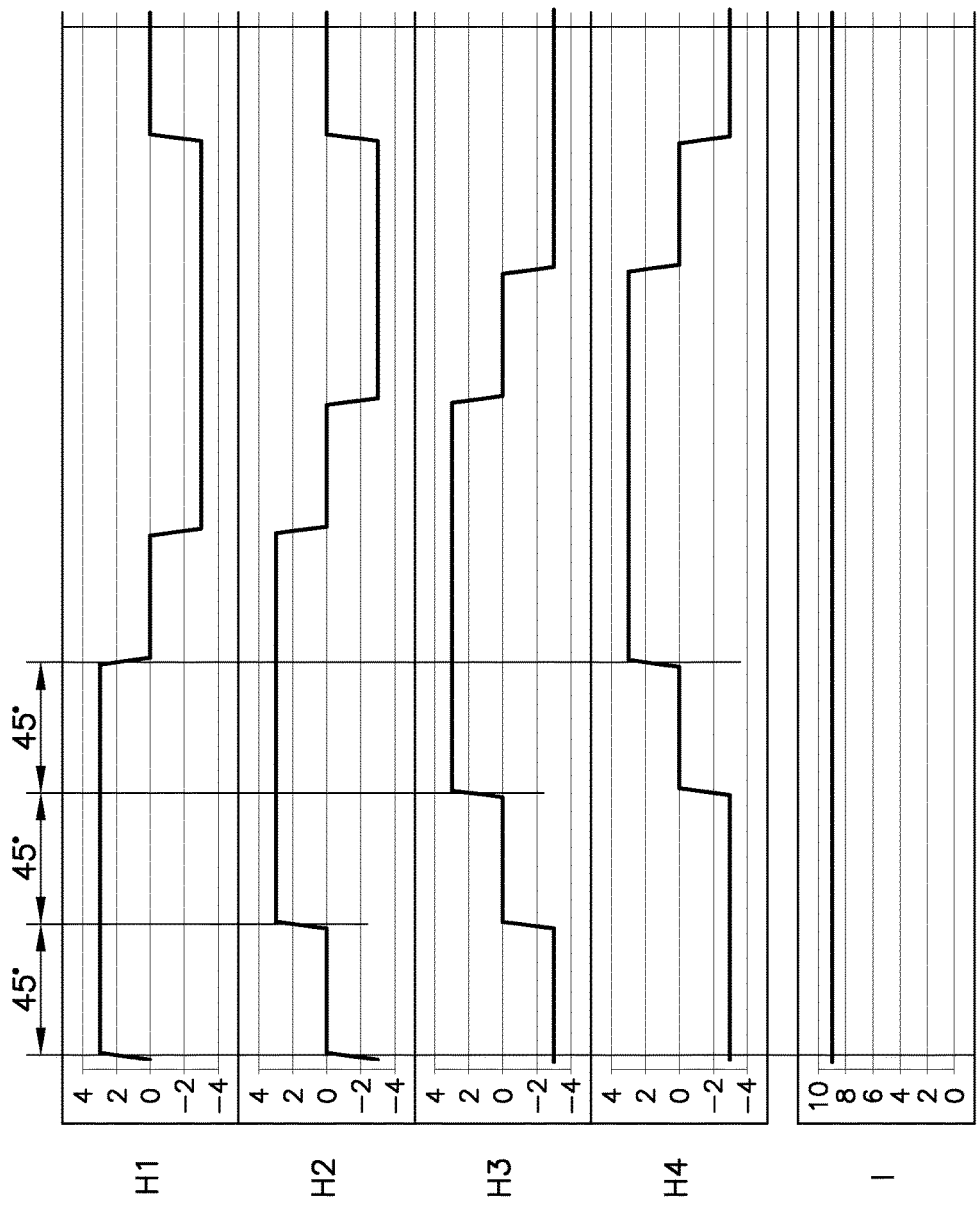

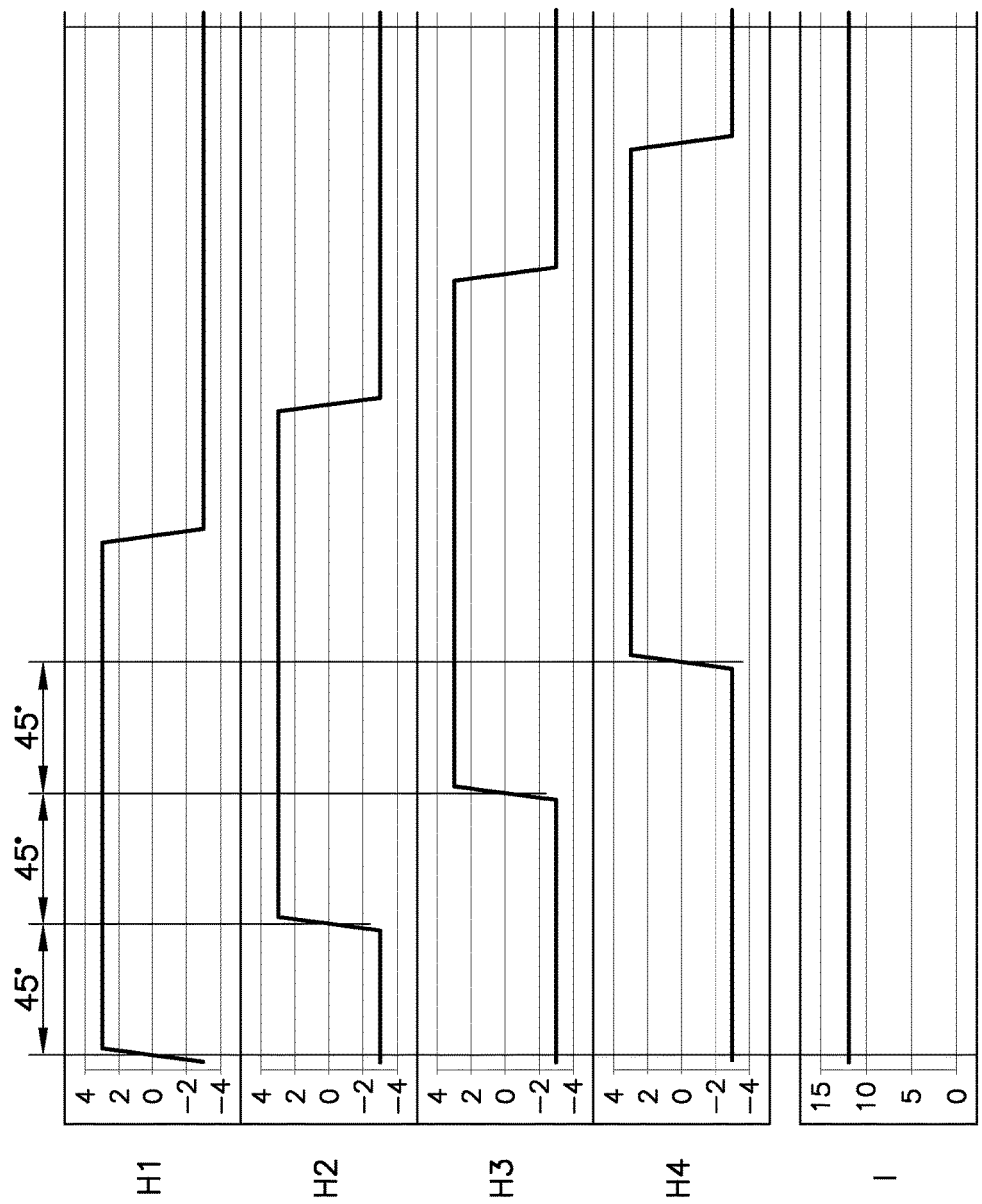

DEVICE AND METHOD FOR CONTROLLING A MODULE FOR HEATING A PLURALITY OF INJECTORS

FIELD OF THE INVENTION

The present invention concerns the heating of fuel injectors of an internal combustion engine of a vehicle, and more particularly concerns a device and a method for controlling a module for heating a plurality of injectors of a vehicle engine, in particular a motor vehicle engine, and also concerns such a vehicle.

BACKGROUND OF THE INVENTION

As is known, a motor vehicle comprises an internal combustion engine comprising a plurality of cylinders. Each cylinder is connected to a piston and comprises a combustion chamber, into which an injector introduces fuel, of which the combustion combined with a combustion agent allows the actuation of the piston. The mechanical force created by the movement of the piston is then transmitted, via transmission elements, to the wheels of the vehicle in order to set said vehicle in motion.

Some fuels, such as ethanol for example, require heating in order to keep them at a minimal temperature of approximately 27° C. in the case of ethanol, because otherwise the combustion of these fuels may be slowed or even inhibited.

To this end, it is known to use a heating module comprising a plurality of induction coils, each coil being mounted around an injector so as to provide said injector with heat when the coil is excited by a current, which then makes it possible to raise the temperature of the fuel passing through the injector.

A device for controlling the heating module makes it possible to control the supply of current to the coils and therefore the heating temperature of the fuel passing through the injectors. Such a device, as is known, comprises a phase shift unit and a battery generating an electric supply current. The phase shift unit comprises a plurality of H bridges connected to said battery and a means for controlling the phase shift of the H bridges relative to one another. The number of H bridges is equal to the number of induction coils, and each H bridge delivers, from the electric supply current provided by the battery, an electric excitation current at the associated induction coil of said H bridge. The battery delivers a continuous current transformed into alternating current of sufficiently high amplitude and frequency to quickly heat the coils, for example 25 amps at 10 kHz.

Each H bridge performs the function of providing to the associated coil an alternating current of which the half-period is defined by a duty cycle. Thus, for example, when the duty cycle is n %, a current of positive amplitude is delivered during n % of the time of a half-period, then the delivered current is zero during the (100−n) % of the remaining time of said half-period. During the following half-period, a current of negative amplitude, which is equal in terms of absolute value to the value of the current of positive amplitude delivered at the previous half-period, is delivered during n % of the time of a half-period, then the current delivered is zero during the (100−n) % of the remaining time of said half-period.

Since the heating power provided by a coil is dependent on the amount of current received continuously, the duty cycle of the current provided by each H bridge is adjusted between 0% and 100%, such that the associated coil provides the desired heating power.

Since the current provided by the battery is dependent on the number of H bridges functioning simultaneously, the phase shift unit is configured to phase shift the operation of the H bridges, for example by 45°, such that said bridges supply the coils in a manner offset over time. In other words, some H bridges deliver current simultaneously, but not all the H bridges deliver current simultaneously. In fact, a simultaneous provision of current by the set of H bridges would lead to an excessive consumption of the battery and to very severe variations in the amplitude of the current of said battery.

Although the current signals delivered by the H bridges phase shifted in this way reduce the variations in amplitude of the current of the battery to a certain extent, they are still just as high and for example may reach several tens of amps.

Such undulations of the current delivered by the battery of the control device may induce electromagnetic waves, which may influence the operation of the electronic components and equipment arranged in the vicinity and thus constitute a significant disadvantage.

In order to overcome this disadvantage, it is known to use a filter referred to as an "EMC" (electromagnetic compatibility) filter, which prevents the significant undulations of the current delivered by the battery.

Such a filter, however, requires the use of one or more capacitors of very high value in the order of 3 000 μF in order to absorb the undulations of the current. The dimensions of such capacitors are relatively substantial, in the order of several centimeters, which considerably increases the size of the device and constitutes a significant disadvantage, in particular within the scope of the use of said device in a motor vehicle in which the available space is limited. Such capacitors also constitute a further cost.

SUMMARY OF THE INVENTION

The object of the present invention is to overcome these disadvantages by proposing a control device that is simultaneously effective, reliable, compact and small.

To this end, the invention firstly relates to a method for controlling a module for heating a plurality of fuel injectors of an internal combustion engine of a vehicle, said heating module comprising a plurality of electromagnetic induction means, each of said electromagnetic induction means being connected to an injector of the plurality of fuel injectors and being configured, when an electric excitation current passes through said electromagnetic induction means, to heat said injector by induction, said method comprising a step of generating an electric supply current and a step of generating, from the electric supply current, a plurality of electric excitation currents phase shifted relative to one another and materialized by electric excitation current signals, each of said electric excitation currents being intended to supply one of the electromagnetic induction means of the plurality of electromagnetic induction means, the method being notable in that the electric excitation current signals are phase shifted, such that the sum of absolute values of the amplitudes of said signals is constant.

In fact, the electric supply current generated is equal to the sum of the absolute values of the amplitudes of the electric excitation current signals. The undulations of the electric supply current are thus considerably reduced or eliminated, which makes it possible to eliminate the electromagnetic waves generated by such undulations. Moreover, it is no longer necessary to perform a filtering of the EMC type, of which the filter circuit requires large components, thus making it possible to significantly reduce the size of the control device carrying out the method according to the invention.

In accordance with a preferred feature of the invention, n electric excitation current signals are generated by being phase shifted by $$\frac{180°}{n},$$

n being a natural number greater than or equal to 1 and equal to the number of injectors equipped with electromagnetic induction means.

Preferably, n electric excitation current signals are generated, an electric excitation current signal being an alternating current of which the half-period is defined by a duty cycle. The method comprises a step of selecting said duty cycle from one of the values $$p \times \frac{100\%}{n}$$

where p is a natural number between 0 and n. Such a selection makes it possible, when the n electric excitation current signals are generated by being phase shifted by $$\frac{180°}{n},$$

to ensure that the sum of the absolute values of the amplitudes of the electric excitation current signals is constant. The higher the duty cycle, the higher is the value of the continuous electric supply current, and the higher is the heating temperature of the fuel. It is thus very easy to control the heating temperature of the fuel whilst ensuring that there are no undulations of the electric supply current.

The invention also relates to a device for controlling a module for heating a plurality of fuel injectors of an internal combustion engine of a vehicle, said heating module comprising a plurality of electromagnetic induction means, each of said electromagnetic induction means being connected to an injector of the plurality of fuel injectors and being configured, when an electric excitation current passes through said electromagnetic induction means, to heat said injector by induction, said device comprising a unit for generating an electric supply current and a phase shift unit configured to generate, from the electric supply current generated by the generation unit, a plurality of electric excitation currents phase shifted relative to one another and materialized by electric excitation current signals, each of said electric excitation currents being intended to supply one of the electromagnetic induction means of the plurality of electromagnetic induction means, the device being notable in that the phase shift unit is configured to phase shift the electric excitation current signals such that the sum of the absolute values of the amplitudes of said signals is constant.

Since the electric current at the terminals of the generation unit corresponds to the sum of the absolute values of the amplitudes of the electric excitation current signals, the undulations of electric current at the terminals of the generation unit are thus considerably reduced or eliminated without the need to add an EMC filter, of which the components are large. The dimensioning of the device is thus significantly reduced, which is very advantageous, in particular in the scope of the use of said device in a motor vehicle.

In accordance with one aspect of the invention, the phase shift unit comprises a number n of H bridges equal to the number of injectors equipped with electromagnetic induction means and a means for controlling said H bridges, each H bridge making it possible to deliver a electric excitation current signal to an electromagnetic induction means at a moment determined by said control means.

The control means is advantageously configured to control periodically the delivery of n electric excitation current signals phase shifted by the n H bridges. In accordance with a preferred aspect of the invention, the electric excitation current signals delivered by the n H bridges are phase shifted by $$\frac{180°}{n}.$$

Since an electric excitation current delivered by an H bridge is an alternating current of which the half-period is defined by a duty cycle, said duty cycle is selected from one of the values $$p \times \frac{100\%}{n}$$

where p is a natural number between 0 and n. Such a selection makes it possible to ensure that the sum of the absolute values of the amplitudes of the electric excitation current signals is constant.

In accordance with one feature of the invention, the electromagnetic induction means are present in the form of a plurality of induction coils.

The invention also relates to a vehicle, in particular a motor vehicle, comprising:
 an internal combustion engine comprising a plurality of fuel injectors,
 a heating module comprising a plurality of electromagnetic induction means, each of said electromagnetic induction means being connected to an injector of the plurality of fuel injectors and being configured, when an electric excitation current passes through said electromagnetic induction means, to heat said injector by induction, and
 a device for controlling said heating module, as presented before.

BRIEF DESCRIPTION OF THE DRAWINGS

Further features and advantages of the invention will become clear from the following description provided with reference to the accompanying figures, which are given by way of non-limiting example and in which identical references are given to similar components:

FIG. 3 illustrates electric excitation current signals phase shifted by 45° and of which the duty cycle is 50% for an exemplary application with 4 H bridges.

FIG. 4 illustrates electric excitation current signals phase shifted by 45° and of which the duty cycle is 75% for an exemplary application with 4 H bridges.

FIG. 5 illustrates electric excitation current signals phase shifted by 45° and of which the duty cycle is 100% for an exemplary application with 4 H bridges.

DETAILED DESCRIPTION OF THE INVENTION

Figure 1:
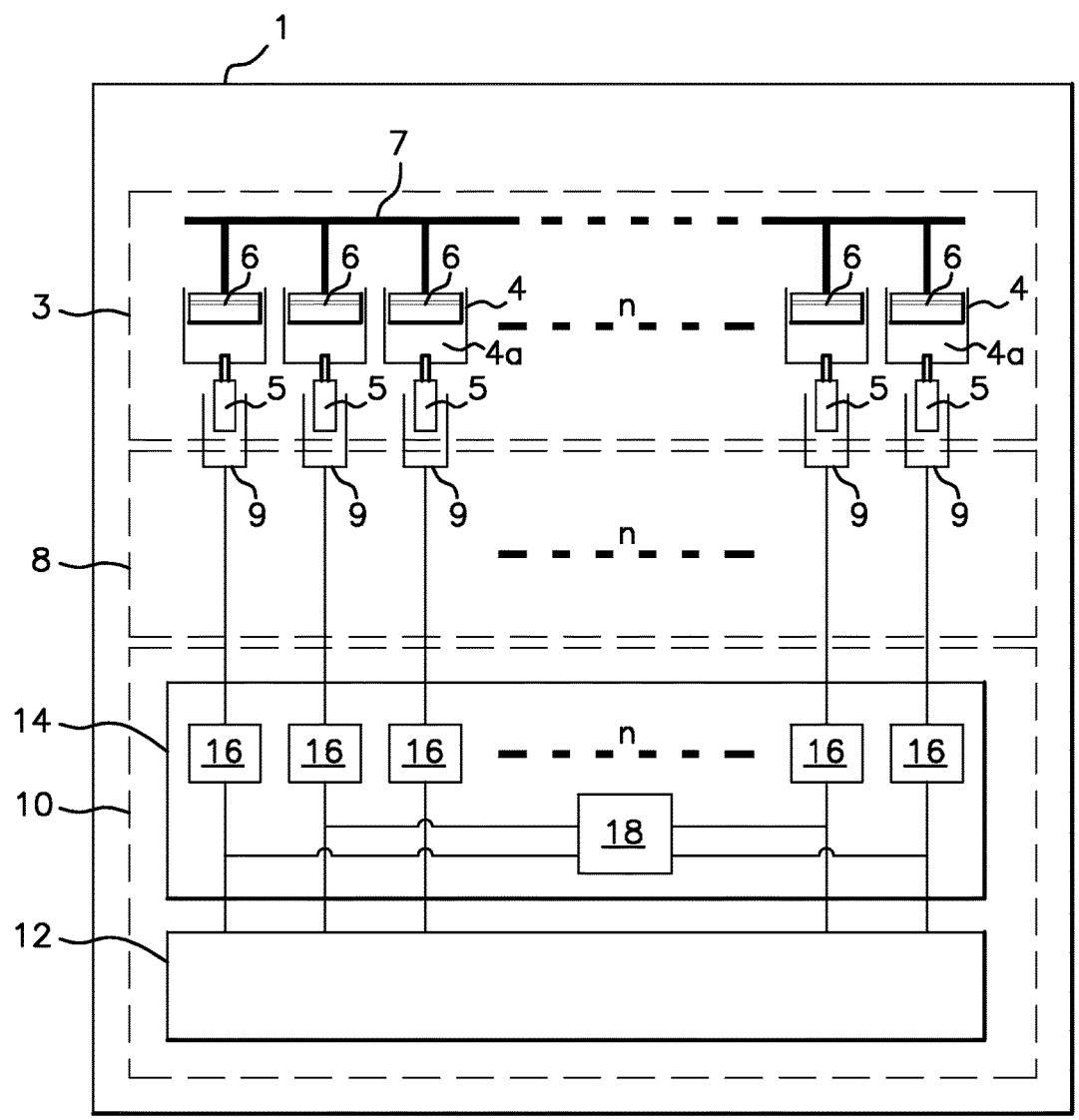
FIG. 1 is a schematic representation of a vehicle according to the invention.

FIG. 1 schematically illustrates a vehicle 1 according to the invention. The vehicle 1 is preferably a motor vehicle, although this does not limit the scope of the present invention, which can apply to any type of vehicle comprising fuel injectors.

Such a vehicle 1 comprises an engine 3, a heating module 8 and a device 10 for controlling said heating module 8.

In this example, the engine 3 is an internal combustion engine, although this does not limit the scope of the present invention. Such an engine 3 comprises n cylinders 4 and n fuel injectors 5, n being a natural number greater than or equal to 1. Each cylinder 4 is connected to a piston 6 and comprises a combustion chamber 4a into which an injector 5 introduces fuel of which the combustion combined with a combustion agent allows the actuation of the corresponding piston 6. The mechanical force created by the movement of the piston 6 is then transmitted, via transmission elements 7, to the wheels (not shown) of the vehicle 1 in order to set said vehicle in motion.

The heating module 8 comprises n electromagnetic induction means, each of said electromagnetic induction means being connected to an injector 5 of the plurality of fuel injectors 5 and being configured to heat said injector 5 by induction when an electrical excitation current passes through said electromagnetic induction means.

In this preferred example, each electromagnetic induction means is present in the form of an electromagnetic induction coil 9 wound around an injector 5 so as to allow the heating of the fuel passing through the injector 5 when the coil 9 is supplied with an electrical excitation current.

The device 10 for controlling the heating module 8 of the fuel injectors 5 comprises a generation unit 12 and a phase shift unit 14.

The generation unit 12 is configured to generate an electric supply current for the phase shift unit 14 and may be present in the form of a power supply battery associated with a current hashing device. Such an assembly for example delivers an alternating current of sufficiently high amplitude and frequency to induce rapid heating of the coils, for example 25 amps at 10 kHz.

The phase shift unit 14 is configured to deliver, from the electric supply current generated by the generation unit 12, a plurality of electric excitation currents materialized by electric excitation current signals, and each of said electric excitation current signals supplies one of the electromagnetic induction coils 9.

In accordance with the invention, the phase shift unit 14 is configured to phase shift the electric excitation current signals such that the sum of the absolute values of the amplitudes of said signals is constant in order to eliminate the undulations of the electric supply current at the terminals of the generation unit 12.

To this end, the phase shift unit 14 comprises n H bridges 16 equal to the number of injectors 4 and a means 18 for controlling said H bridges 16, each H bridge 16 making it possible to deliver an electric excitation current signal to an injector 4 at a moment determined by said control means 18.

The control means 18 is configured to determine n separate moments for the provision of n phase-shifted electric excitation current signals by the n H bridges 16.

The phase shift unit 14 is configured to phase shift the electric excitation current signals delivered by the n H bridges 16 phase shifted by $$\frac{180°}{n}$$

relative to one another.

The electric excitation current delivered by an H bridge 16 is an alternating current of which the half-period is defined by a duty cycle. In order to ensure that the sum of the absolute values of the amplitudes of the electric excitation current signals is constant, this duty cycle is selected from one of the values $$p \times \frac{100\%}{n}$$

where p is between 0 and n, n being the number of electromagnetic induction coils 9.

FIGS. 2 to 5 illustrate examples of electric excitation current signals and electric supply current signals for a number of electromagnetic induction coils n equal to 4.

The generation unit 12 firstly generates an electric supply current in a step E1.

Then, in a step E2, the phase shift unit 14 generates, from the electric supply current generated by the generation unit 12, a plurality of electric excitation currents materialized by electric excitation current signals that have been phase shifted such that the sum of the absolute values of the amplitudes of said signals is constant.

With reference to FIG. 1, each H bridge 16 delivers, from the electric supply current generated by the generation unit 12, an electric excitation current, and the means 18 for controlling the phase shift unit 14 periodically determines four separate moments such that the four H bridges 16 periodically deliver four electric excitation current signals phase shifted by 45° relative to one another.

With reference to FIGS. 2 to 5, the electric excitation current signals "H1", "H2", "H3" and "H4" are alternating current of which the half-period is defined by a duty cycle and of which the frequency "F" is fixed and is between 10 kHz and 30 kHz.

In accordance with the invention, the duty cycle of each electric excitation current signal "H1", "H2", "H3" and "H4" is selected from one of the values p×100%/4 where p is between 0 and 4 (since in the case illustrated in FIGS. 2 to 5 n=4), that is to say the duty cycle assumes the values 0%, 25%, 50%, 75% and 100% respectively.

Such a selection advantageously makes it possible to ensure that the sum of the absolute values of the amplitudes of the electric excitation current signals "H1", "H2", "H3" and "H4", corresponding to the signal of the electric supply current "I" generated by the generation unit 12, is constant and that there are thus no longer any undulations of the electric current at the terminals of the generation unit 12.

The choice of the duty cycle is made depending on the necessary heating power. Thus, the higher the duty cycle, the greater the heating power.

Still with reference to FIGS. 2 to 5, each electric excitation current supplies one of the electromagnetic induction coils 9, denoted "H1", "H2", "H3" and "H4" consecutively, of the heating module 8 in order to heat the fuel passing through the injector 5 on which the coil 9 is wound.

FIGS. 2 to 5 illustrated the variations of the electric excitation current signals "H1", "H2", "H3" and "H4" between 3 A and −3 A over a period defined by the frequency F.

Figure 2:
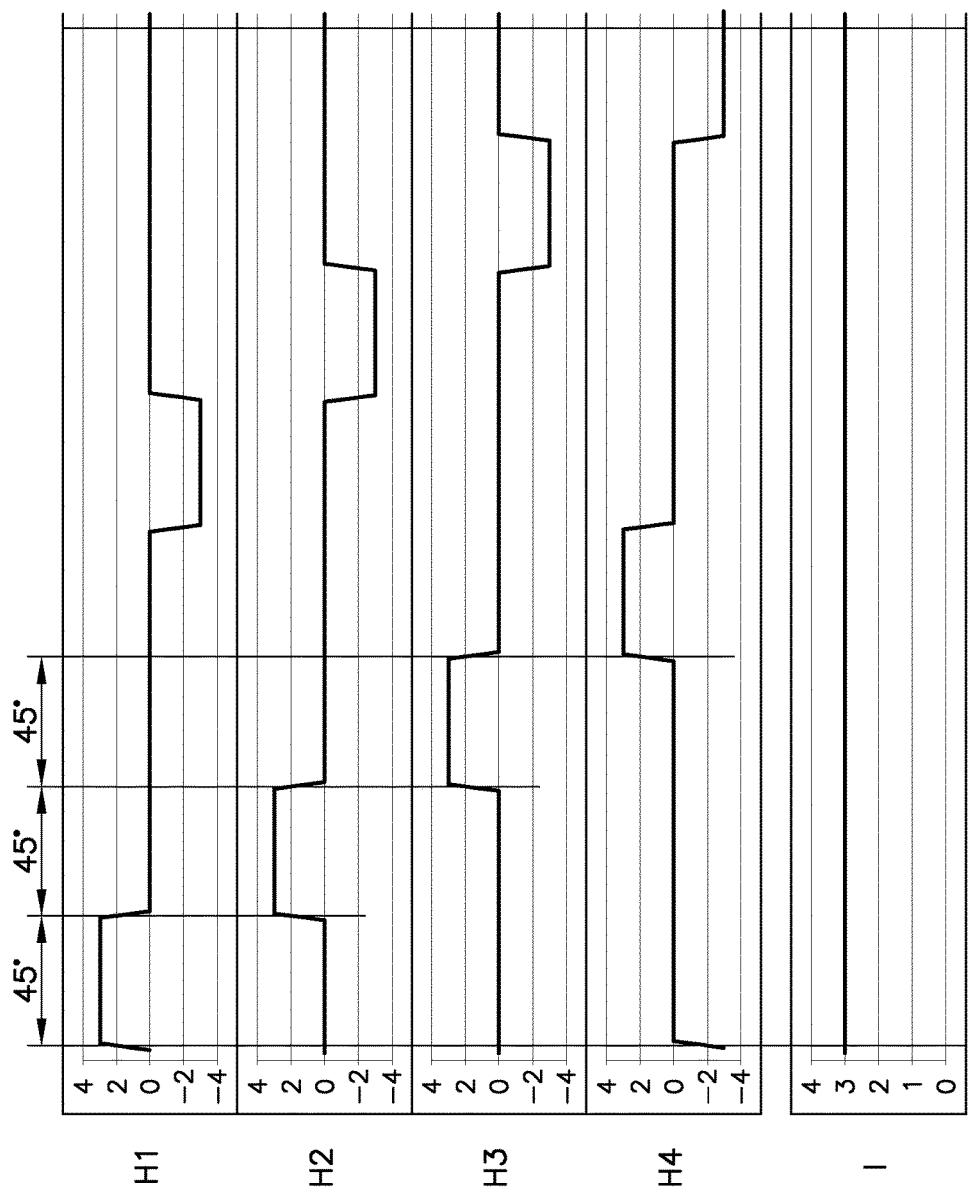
FIG. 2 illustrates electric excitation current signals phase shifted by 45° and of which the duty cycle is 25% for an exemplary application with 4 H bridges.

With reference to FIG. 2, the duty cycle of each electric excitation current signal "H1", "H2", "H3" and "H4" is 25%. The electric excitation current signals "H1", "H2", "H3" and "H4" are phase shifted by 45°, the current range of said signals varies between 3 A and −3 A, but two signals are never at the maximum amplitude thereof (in absolute value) of 3 A simultaneously. Since the signal of the electric supply current "I" corresponds to the sum of the absolute values of the amplitudes of the electric excitation current signals "H1", "H2", "H3" and "H4", it is thus constant and equal to 3 A.

With reference to FIG. 3, the duty cycle of each electric excitation current signal "H1", "H2", "H3" and "H4" is 50%. The electric excitation current signals "H1", "H2", "H3" and "H4" are phase shifted by 45°, the current range of said signals varies between 3 A and −3 A, and two of the signals are at the maximum amplitude thereof (in absolute value) of 3 A simultaneously, whilst the amplitude of the two other signals is zero. Since the signal of the electric supply current "I" corresponds to the sum of the absolute values of the amplitudes of the electric excitation current signals "H1", "H2", "H3" and "H4", it is thus constant and equal to 6 A.

With reference to FIG. 4, the duty cycle of each electric excitation current signal "H1", "H2", "H3" and "H4" is 75%. The electric excitation current signals "H1", "H2", "H3" and "H4" are phase shifted by 45°, the current range thereof varies between 3 A and −3 A, and three of the four signals are at the maximum amplitude thereof (in absolute value) of 3 A simultaneously, whereas the amplitude of the fourth signal is zero. The signal of the electric supply current "I", corresponding to the sum of the absolute values of the amplitudes of the electric excitation current signals "H1", "H2", "H3" and "H4", is thus constant and equal to 9 A.

With reference to FIG. 5, the duty cycle of each electric excitation current signal "H1", "H2", "H3" and "H4" is 100%. The electric excitation current signals "H1", "H2", "H3" and "H4" are phase shifted by 45°, the current range thereof varies between 3 A and −3 A, and the four signals are at the maximum amplitude thereof (in absolute value) of 3 A simultaneously. The signal of the electric supply current "I", corresponding to the sum of the absolute values of the amplitudes of the electric excitation current signals "H1", "H2", "H3" and "H4", is thus constant and equal to 12 A.

The method according to the invention thus advantageously makes it possible to avoid the use of an EMC filter, which reduces the dimensions of the device whilst avoiding the generation of electromagnetic interference created by undulations in current at the terminals of the generation unit of the device, simultaneously reducing cost.

The invention is not limited to the embodiment described above and can be extended to any adaptation envisaged by a person skilled in the art. For example, it is not necessary to equip all the injectors with heating means, or it is possible to provide more than one injector per cylinder.

Lastly, it will be noted that the invention has been presented for an application of heating fuel injectors of a vehicle engine. Nevertheless, it goes without saying that the invention is applicable to any electromagnetic induction heating device, in particular in all fields of transport or industry.

The invention claimed is:

1. A device for controlling a module configured to heat a plurality of fuel injectors of an engine of a vehicle, said heating module including a plurality of electromagnetic induction devices, each of said electromagnetic induction devices being connected to an injector of the plurality of fuel injectors and being configured, when an electric excitation current passes through said electromagnetic induction devices, to heat said injector by induction, said device comprising:
   a power generator configured to generate an electric supply current; and
   a phase shift system configured to generate, from the electric supply current generated by the power generator, a plurality of electric excitation currents phase shifted relative to one another and materialized by electric excitation current signals, each of said electric excitation currents supplying at least one of the electromagnetic induction devices of the plurality of electromagnetic induction devices, the phase shift system comprising
   a number of H bridges equal to the number of injectors equipped with electromagnetic induction devices, and
   a controller configured to control the delivery of n electric excitation current signals phase shifted $$\frac{180°}{n}$$

via said H bridges, each H bridge enabling delivery of an electric excitation alternating current signal to an electromagnetic induction device at a moment determined by said controller,
   wherein the phase shift system is configured to phase shift the electric excitation current signals such that, for each of a plurality of duty cycles, the sum of the absolute values of the amplitudes of said signals is equal to a constant value at any given time,
   wherein an electric excitation current delivered by an H bridge is an alternating current of which the half-period is defined by one of the duty cycles, said duty cycle being selected from one of the values $$p \times \frac{100\%}{n}$$

where p is natural number between 0 and n.

2. The device as claimed in claim 1, wherein the electromagnetic induction devices are a plurality of induction coils.

3. A vehicle comprising:
   an engine comprising a plurality of fuel injectors;
   a heating module comprising a plurality of electromagnetic induction devices, each of said electromagnetic induction devices being connected to an injector of the plurality of fuel injectors and being configured, when an electric excitation current passes through said electromagnetic induction devices, to heat said injector by induction; and the device for controlling said heating module as claimed in claim 1.

4. A method for controlling the module configured to heat the plurality of fuel injectors of the engine of the vehicle using the device according to claim 1, said heating module including a plurality of electromagnetic induction devices, each of said electromagnetic induction devices being connected to an injector of the plurality of fuel injectors and being configured, when an electric excitation current passes through said electromagnetic induction devices, to heat said injector by induction, said method comprising:

generating an electric supply current;

generating, from the generated electric supply current, a plurality of electric excitation currents phase shifted relative to one another and materialized by electric excitation current signals, each of said electric excitation currents supplying at least one of the electromagnetic induction devices of the plurality of electromagnetic induction devices, n electric excitation current signals being generated by being phase shifted by $$\frac{180°}{n},$$

n being natural number greater than or equal to 1 and equal to the number of injectors equipped with electromagnetic induction devices, each electric excitation current signal being an alternating current of which the half-period is defined by a duty cycle selected from one of the values $$p \times \frac{100\%}{n}$$

where p is a power level of the duty cycle and is a natural number between 0 and n, such that, for the selected duty cycle, the sum of the absolute values of the amplitudes of said signals is equal to a constant value at any given time.

* * * * *